(12) United States Patent
Tourn

(10) Patent No.: US 8,757,536 B2
(45) Date of Patent: Jun. 24, 2014

(54) AERIAL DEVICE

(76) Inventor: Jean-Claude Tourn, Monaco (MC)

( * ) Notice: Subject to any disclaimer, the term of this patent is extended or adjusted under 35 U.S.C. 154(b) by 293 days.

(21) Appl. No.: 12/670,572

(22) PCT Filed: Jul. 24, 2008

(86) PCT No.: PCT/FR2008/001104
§ 371 (c)(1),
(2), (4) Date: May 25, 2010

(87) PCT Pub. No.: WO2009/044013
PCT Pub. Date: Apr. 9, 2009

(65) Prior Publication Data
US 2010/0252673 A1    Oct. 7, 2010

(30) Foreign Application Priority Data
Jul. 24, 2007   (MC) .......................................... 2536

(51) Int. Cl.
*B64C 27/18* (2006.01)
(52) U.S. Cl.
USPC ..................................... 244/17.11; 244/17.23
(58) Field of Classification Search
USPC .............. 244/6, 7 R, 7 A, 17.11, 17.23, 17.19
See application file for complete search history.

(56) References Cited

U.S. PATENT DOCUMENTS

| | | | | |
|---|---|---|---|---|
| 2,437,700 A | * | 3/1948 | MacFarland, Jr. ............ | 416/129 |
| 2,509,359 A | * | 5/1950 | Margolis ...................... | 60/39.35 |
| 2,667,226 A | * | 1/1954 | Doblhoff ..................... | 416/20 R |
| 2,814,349 A | * | 11/1957 | Berry ............................. | 416/21 |
| 2,831,543 A | * | 4/1958 | Matthews .................... | 416/20 R |
| 2,894,589 A | * | 7/1959 | Ehrich ............................. | 416/21 |
| 3,032,120 A | * | 5/1962 | Lee et al. ........................ | 416/21 |
| 3,116,040 A | * | 12/1963 | Petrides et al. ............. | 244/17.13 |
| 3,176,413 A | * | 4/1965 | Dornier et al. ............. | 244/17.11 |
| 3,768,926 A | * | 10/1973 | Pegg et al. ...................... | 416/21 |
| 3,792,827 A | * | 2/1974 | Girard ........................... | 244/7 A |
| 3,930,625 A | * | 1/1976 | Krivka ....................... | 244/17.23 |
| 4,589,611 A | * | 5/1986 | Ramme et al. .................... | 244/6 |

(Continued)

FOREIGN PATENT DOCUMENTS

| | | |
|---|---|---|
| CH | 260009 A | 2/1949 |
| GB | 612189 A | 11/1948 |

OTHER PUBLICATIONS

"Kamov Ka-26," Wikipedia, pp. 1-6 (Publication date unknown).
"Tandem Rotors," Wikipedia, pp. 1-3 (Publication date unknown).

(Continued)

*Primary Examiner* — Tien Dinh
*Assistant Examiner* — Steven Hawk
(74) *Attorney, Agent, or Firm* — Jenkins, Wilson, Taylor & Hunt, P.A.

(57) ABSTRACT

The present invention consists of an aerial device, comprising a structure and a rotating element equipped with at least one blade, suitable for effecting a rotation relative to the structure around a rotation axis, wherein the device is equipped with means making it possible to cause the rotating element to rotate relative to the structure and wherein these means include a gas generator and a pipe that makes it possible to guide the gas towards an orifice at a distance from this rotation axis in order to cause the rotating elements to rotate by means of the gas ejected through the orifice, characterized in that the generator outlet and the pipe are part of the rotating elements and are suitable for rotating around the rotation axis relative to the structures.

6 Claims, 12 Drawing Sheets

(56) References Cited

U.S. PATENT DOCUMENTS

| | | | | |
|---|---|---|---|---|
| 5,149,014 A | * | 9/1992 | Faller | 244/17.11 |
| 5,454,530 A | * | 10/1995 | Rutherford et al. | 244/7 A |
| 5,516,060 A | * | 5/1996 | McDonnell | 244/7 B |
| 5,788,181 A | * | 8/1998 | Wilson | 244/7 A |
| 5,842,665 A | * | 12/1998 | McKinney et al. | 244/7 A |
| 5,984,635 A | * | 11/1999 | Keller | 244/6 |
| 6,885,917 B2 | * | 4/2005 | Osder et al. | 244/7 A |
| 7,014,142 B2 | * | 3/2006 | Barocela et al. | 244/7 A |
| 7,275,711 B1 | * | 10/2007 | Flanigan | 244/17.11 |
| 7,600,711 B1 | * | 10/2009 | Nyhus | 244/7 A |
| 7,624,942 B2 | * | 12/2009 | Roberge | 244/7 A |
| 8,011,614 B2 | * | 9/2011 | Bird | 244/7 A |
| 2004/0000614 A1 | * | 1/2004 | Leyva et al. | 244/17.11 |

OTHER PUBLICATIONS

"Kaman K-MAX," Wikipedia, pp. 1-4 (Publication date unknown).
International Search Report for International Application No. PCT/FR2008/001104 (Jul. 29, 2009).

* cited by examiner

AERIAL DEVICE

The invention relates to an aerial device comprising a structure and a rotating element equipped with at least one blade, suitable to effect a rotation relative to the structure around a rotation axis.

The aerial device is suitable for generating, with the rotating element, an aerodynamic force. The device according to the invention can, by itself or connected to a load, operate as a heavier-than-air aircraft.

In the following text, the words "heavier-than-air aircraft" refer to an apparatus capable of moving around within the earth's atmosphere. The heavier-than-air aircraft, itself, is heavier than air, but its lift is guaranteed by an aerodynamic force, the ascending force, which is produced with the aid of one or more blades.

The device according to the invention can, by itself or connected to a load, fly in a manner comparable to that of a helicopter. Helicopters, in comparison with conventional fixed-wing aircraft possess considerable advantages. Helicopters can carry out stationary flight. This means that helicopters can maintain a fixed position in flight. That makes it possible for them to reach locations which would be inaccessible to its fixed-wing equivalent which almost always need to use a runway.

Furthermore, in comparison with planes, a helicopter has a more complex design. It is more expensive to purchase and to use. Furthermore a conventional helicopter is equipped with a main rotor, which has a substantially vertical axis. This rotor ensures the lift and also the altitude control and the longitudinal control and rolling movement of the helicopter.

If the main rotor is used on a helicopter, its rotation is effected by means of a motor. This action produces a torque on the structure of the helicopter. In order to compensate for this torque, the helicopter needs a second rotor which is generally called a "tail rotor" or "anti-torque rotor". The axis of this second rotor is substantially horizontal. This second rotor prevents the helicopter itself from rotating when the main rotor rotates and makes it possible to ensure the yaw control.

In the prior art, several solutions are revealed for avoiding the relatively complex construction with a main rotor and a tail rotor. A first solution is proposed by the Russian constructor Kamov. The helicopters bearing the name of this constructor use two coaxial lift rotors rotating anti-clockwise.

A second solution proposed is one which offers the use of two lifting rotors in tandem. The first rotor is positioned behind the other one. The two rotors rotate in opposite directions. This system was developed by the American Frank Piaseki.

Another helicopter, which can function without a tail rotor, is marketed under the name "K-Max". It is equipped with two main rotors. The two rotors are mounted on the crew compartment of the helicopter, forming an angle which makes it possible for the moment produced by a first rotor by using the second rotor to be neutralised.

According to the prior art, helicopters have proven that it is possible to fly with a helicopter without possessing a tail rotor mounted on the rear of the helicopter to neutralise the moment produced by the main rotor of said helicopter.

Nevertheless, an important disadvantage of the solutions according to the prior art is the fact that their constructions remain relatively complex, and thus expensive.

In accordance with the observations above, the aim of the present invention is to provide an aerial device which can fly either by itself, or connected to a load, in the same manner as a traditional helicopter but which is, in comparison, of relatively light and simple construction.

The object of the invention is an aerial device, comprising a structure and a rotating element equipped with at least one blade, suitable for effecting a rotation relative to the structure around a rotation axis, wherein the device is equipped with means making it possible to cause the rotating element to rotate relative to the structure and wherein these means include a gas generator and a pipe that makes it possible to guide the gas towards an orifice at a distance from this rotation axis in order to cause the rotating element to rotate by means of the gas ejected through the orifice, wherein the generator outlet and the pipe are part of the rotating element and are suitable for rotating around the rotation axis relative to the structure.

In the text, reference is made to the "outlet of the generator". Using this expression, reference is made to the element which is responsible for the distribution of the gases produced by the generator.

According to a preferred form of embodiment, the generator is positioned in the device with its central axis concentric to the rotation axis of the rotating element.

The result of this embodiment is that the rotating element is actuated by means of a jet of gas expelled through the orifice at the end of the pipe. This jet of gas is the product of an air current that is generated and guided in the rotating element itself. This means that the production of this jet of gas does not lead to resultant moment which has to be neutralised by an additional rotor. Furthermore, the outlet of the gas generator rotates relative to the structure. This presents the advantage that the device according to the invention does not need complicated connections to guide the air current from a generator, which is part of a stationary element of the device, in the direction of a rotating element.

Correspondingly, the construction of the device according to the invention can be relatively easy and thus relatively economical.

Due to the fact that the system is relatively simple, and therefore relatively economical, the device according to the invention can be used to transport, in a timely and automatic manner, loads of any type, for example humanitarian, first aid, food supplies, water for fire-fighting, munitions, search systems, etc.

The device according to the invention is thus particularly suitable for agricultural work, for example for the dispersion of fertilisers on land.

Furthermore, the device according to the invention can take off and land vertically, which means that the device can be used above impractical or hostile terrains. The great advantage of the construction of the device according to the invention resides in the fact that this device does not have any of the heavy, complex and expensive elements which generally make up helicopters. This means that the elements such as the clutch for the main rotor and the tail rotor, the fuselage anti-torque rotor are no longer necessary.

According to the invention, the device can use a gear reduction box.

It should be noted that, in the prior art, a helicopter is marketed under the name "DJINN". This is equipped with a propeller which has at least two blades which are provided, at their ends, with orifices which allow a jet of air to pass. Nevertheless, the production of the air current on such a "DJINN" helicopter is realised in the stationary part of the helicopter. This means that this needs complicated connections which allow the air current to pass from a generator towards the ends of the helicopter's propellers.

According to a preferred form of embodiment, the pipe is placed in the blade or is integral with the blade, in order to guide the gas to the interior of the orifice of the blade spaced apart from the rotation axis. According to this form of embodiment, the pipe is positioned in the blade, or is part of the blade. This means that the blade has two functions. Firstly, it is used to guide the gas to an orifice spaced apart from the rotation axis of the rotating element, hereby allowing the rotating element to be rotated relative to the structure. Secondly, the blade is used to create an aerodynamic surface making it possible to generate the ascending force.

According to a preferred form of embodiment, the gas generator is positioned in the blade or is integral with the blade. According to this form of embodiment, the pipe and the generator are mounted inside the blade or are part of the blade. The fact that the generator is inside the blade or is integral with the blade, means that the route of the ejected gas is shortened as much as possible.

According to a preferred form of embodiment, this rotating element is equipped with at least one motor arm which extends in a direction that is essentially perpendicular to the rotation axis and in which the pipe is positioned in the motor arm in order to guide the gas towards an orifice in the motor arm, at a distance from the rotation axis. According to this form of embodiment, a separation is realised between the blades used to produce an aerodynamic surface and to hereby create the ascending force for the device according to the invention and the motor arms which are used to eject the gas at a distance from the rotation axis of the rotating element.

A first advantage of this solution lies in the fact that the heat of the gas ejected by the generator is kept at a distance from the blade. This means that the constructor keeps the total freedom for the construction of the blades, without needing to use a material capable of withstanding a high temperature. Furthermore, as the motor arms are present, they can thus be connected, in a fixed manner, to the rotating element. In order to control the ascending force, the angle of incidence of the blades is varied. This means that the blades are mounted on the rotating element so as to allow them to rotate relative to the structure. The motor arms are not necessary to the variation of the angle of incidence.

It is noted that in the text reference is made to "motor arms". By means of this phrase, reference is made to tubes suitable to conduct gas generated by a generator, in the direction of an orifice which makes it possible for it to be ejected. Such a motor arm can be constructed using any material which is suitable to withstand heat, such as stainless steel.

In a preferred form of embodiment, the motor arm is profiled in order to contribute to the lift generated by the rotating element. The motor arms which have an aerodynamic profile can assist in the production of the ascending force.

In a preferred form of embodiment, the rotating element is connected to the structure by means of a gimbal. The effect which results from this measure lies in the fact that the Coriolis forces are avoided.

Alternatively, it is possible that the blades are connected to the rotating element by means of a homokinetic joint.

According to a preferred form of embodiment, the structure is suitably for fixing the aerial device on a load. Such a load can take the form of a cabin which, in combination with the device according to the invention, could resemble a traditional helicopter.

Alternatively, the device according to the invention can be fixed on all sorts of loads. Examples of these are:
- containers,
- land or maritime vehicles,
- construction materials,
- a quantity of water, if the device according to the invention is to be used in fire-fighting.

It should be understood that the device according to the invention can be used to move a multitude of other loads.

According to a preferred form of embodiment, the device is equipped with a remote control to remotely control the lift generated by the rotating element. It should be noted that it is possible for the device according to the invention to function autonomously. In that case, the device is, for example, operated by means of a computer-assisted management. This measure means that the device according to the invention can be used without a person being obliged to transport it.

Secondly, the invention concerns a heavier-than-air aircraft equipped with an aerial device according to the invention.

The details and the advantages of the device according to the invention shall appear more clearly from a reading of the text with reference to the following drawings, in which.

Figure 1:
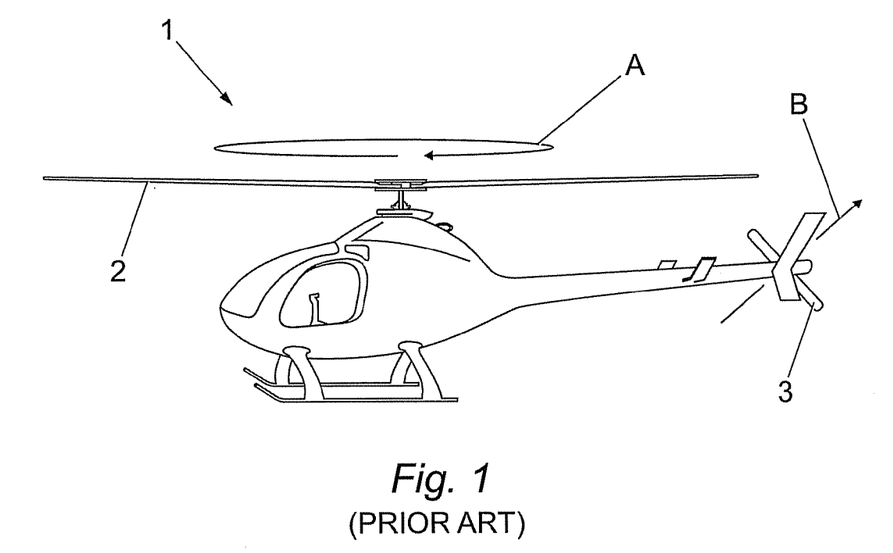
FIG. 1 shows a conventional helicopter according to the prior art.

FIG. 1 shows a conventional helicopter according to the prior art. The helicopter 1 is equipped with a main rotor 2 and equipped with an additional tail rotor 3 at the rear of the of the helicopter. The main rotor 2 produces a resultant moment (A) on the helicopter. The helicopter 1 needs the second rotor 3 in order to produce a moment in the direction (B) so as to neutralise the resultant moment (A) of the main rotor.

The main rotor 2 and the tail rotor 3 each need heavy and complex elements such as a clutch, a transmission gearbox, fuselage, etc. This means that the construction of a helicopter according to the prior art, with a main rotor 2 and a tail rotor 3, represents a relatively expensive construction.

Figure 2:
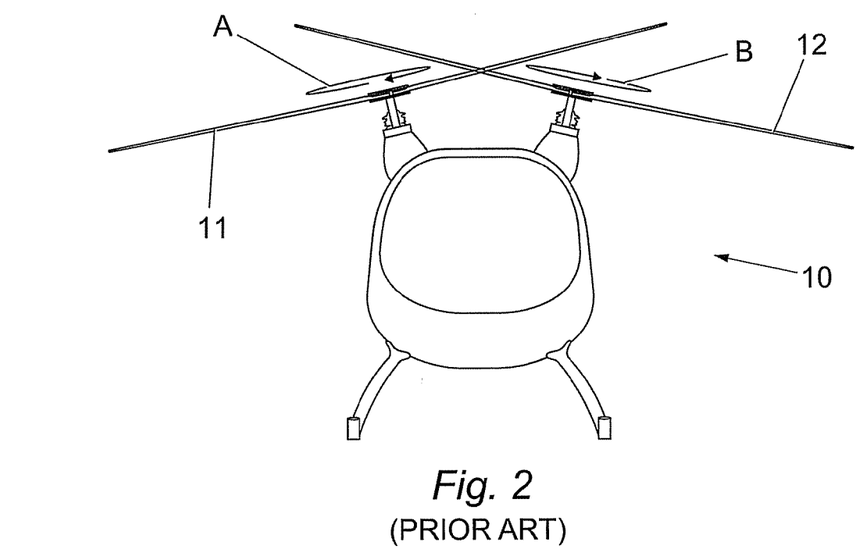
FIG. 2 shows a "K-Max" helicopter.

FIG. 2 shows a helicopter according to the "K-Max" principle. The helicopter 10 is equipped with a first rotor 11 and a second rotor 12. The rotors 11 and 12 are mounted in such a manner that they form an angle.

The rotor 11 produces a resultant moment (A) which is neutralised by the moment (B) generated by the rotor 12.

Figure 3:
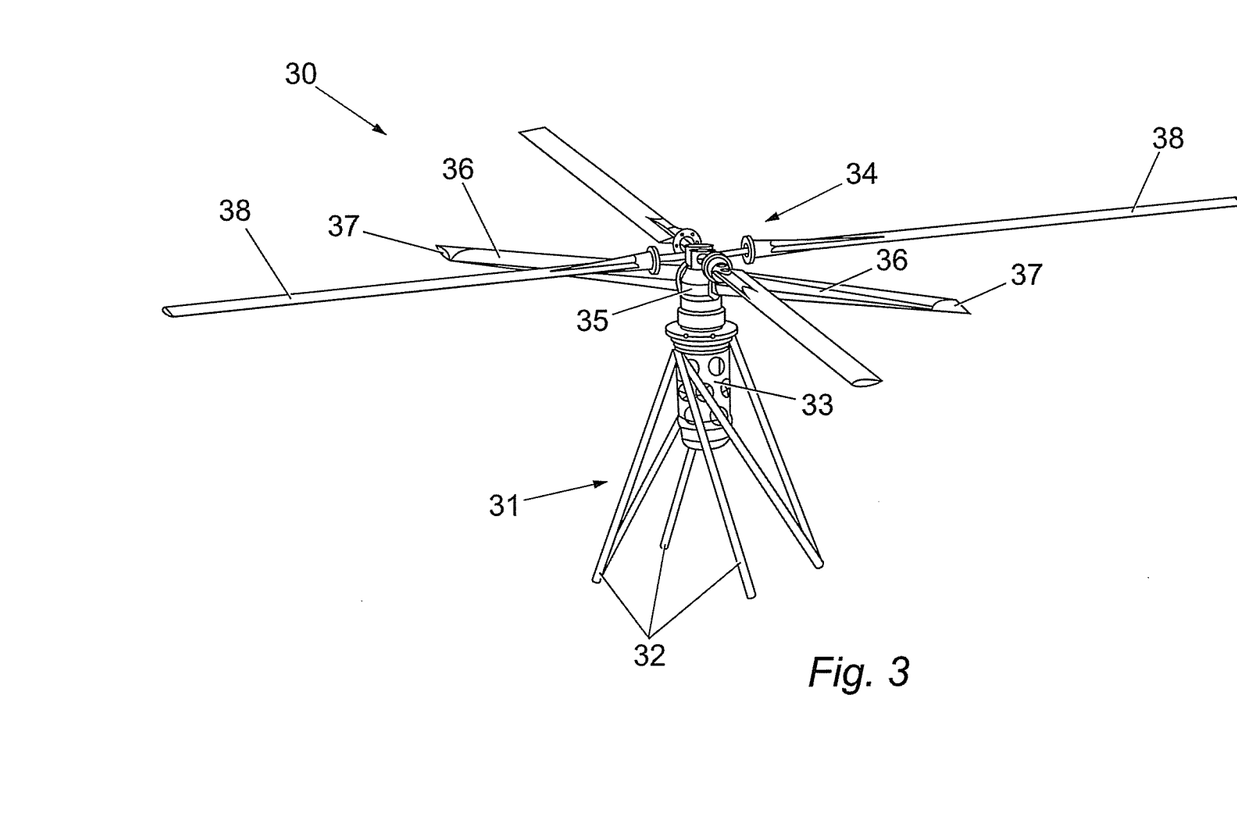
FIG. 3 shows an aerial device according to the invention.

FIG. 3 shows a first form of embodiment of an aerial module 30 according to the invention. The aerial device 30 includes a structure 31 in order to fix the device 30 on a support such as a load. This structure 31 is equipped with fixing elements 32 which make it possible to connect the device 30 to a load.

Figure 4:
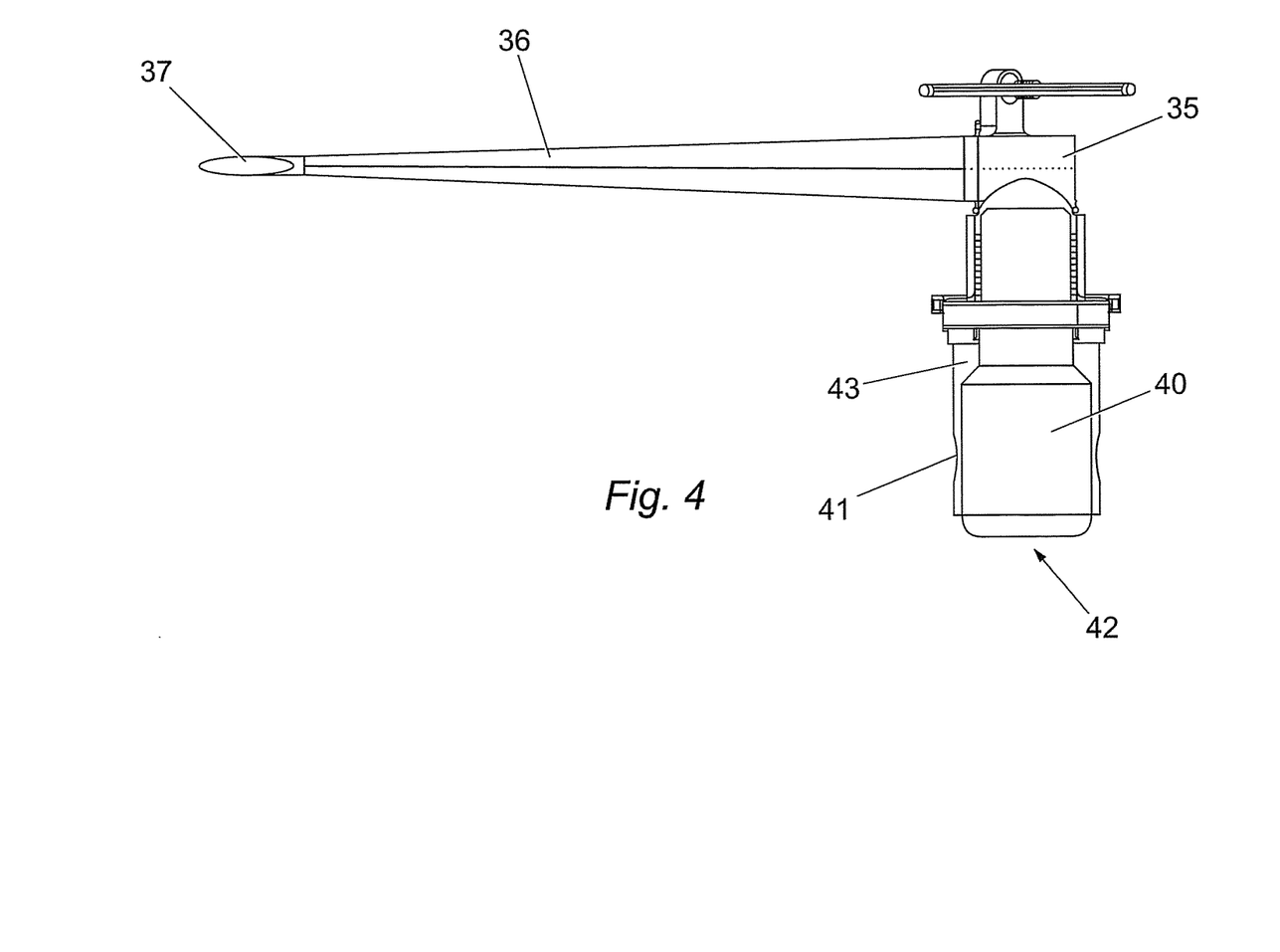
FIG. 4 shows in detail the positioning of the gas generator in the aerial device according to the invention, according to a first form of embodiment.

Furthermore, the structure 31 is itself equipped with an element 33 which makes it possible to receive the propulsion element of the device 30, such as a gas generator (see FIG. 4). The structure 31 is suitable for forming a static element of the device 30 according to the invention.

Secondly, the aerial device 30, according to FIG. 3, includes a rotating element 34. The element 34 is suitable for effecting a rotation relative to the structure 31 around a rotation axis. The rotating element 34 includes a device for distributing gases 35. This device for distributing gases 35 is directly linked to the gas generator which is located inside the element 33.

Two motor arms 36 are directly fixed on the device for distributing gases 35, each of them being equipped, at their end, by an orifice 37 suitable for an ejection of gas in a direction which is essentially perpendicular to the longitudinal axis of the motor arms 36.

The motor arms are used in order to create a distance between the rotation axis of the rotating element 34 and the orifices 37 which make it possible to eject the gases. The rotating element 34 also includes blades 38. Each of the blades 38 is mounted on the rotating element 34 in order to make it possible to vary the angle of incidence of the blades 38. The blades 38 have a symmetrical or asymmetrical profile and rotationally interact in accordance with the same principle as the wings of a plane. Since the rotating element 34 always rotates at constant angular velocity, it is the variation in the angle of incidence of the blades 38, i.e. the angle formed between the chord of the blades 38 and the relative wind, which causes a modification of the position of the aircraft. In order to rise with the device 30, at a constant speed, the incidence of the blades is increased. Conversely, in order to descend, the angle of incidence of the blades 38 is reduced.

The construction of the device 30 according to FIG. 3 shows that it is possible, with the device 30, to create an ascending force with the blades 38, without a reaction torque being brought to bear on the structure 31. This is the reason why the device 30 according to FIG. 3 can be fixed directly on a support such as a load and the assembly can fly without having recourse to means for compensating for this torque.

The structure 31 shown in FIG. 3 can, for this reason, be used as a propulsion means which is relatively simple and thus relatively economical.

In order to better control the forces generated by the device 30 and in order to operate the device 30 during a flight, the assembly of gas reactors, the device for the distribution of gases 35, the motor arms 36 and the blades 38 can be mounted on a gimbal. This means that there is a possibility of regulating the position of the rotating element 34 relative to the structure 31 whilst avoiding the Coriolis forces. Alternatively, the assembly of blades 38 can be mounted on a homokinetic joint.

Some elements of the device 30 according to FIG. 3 are shown in greater detail in FIG. 4. The number 40 schematically represents a gas generator. This produces an air current which will be used in order to cause the element 34 to rotate relative to the structure 31. The gas generator is surrounded by a connection 41 in order to fix the gas generator in the element 33 of the structure 31. The gas produced by means of the gas generator 40 is forced in the direction of the device for distributing the gases 35. As described with reference to FIG. 3, this device for distributing the gases 35 is part of the rotating element 34.

The construction with the device for distributing the gases 35, which is part of the rotating element 34, makes it possible for air to pass towards the motor arms 36 in the direction of the orifices 37 without needing any connection which is neither complicated nor expensive.

The device 30 according to FIGS. 3 and 4 shows that the reactor is essentially positioned vertically, concentric to the mast of the blades 38. The exhaust gases are directly ejected into the motor arms 36.

It should be noted that, in a preferred form of embodiment, the motor arms 36 are also profiled in order to create an additional aerodynamic surface in order to contribute to the production of the ascending force by means of the motor arms 36.

For a construction, such as shown in FIG. 4, the air inlet 41 is located at the bottom of the gas generator 40 surrounded by a structure 43. The combination of gas generator 40 and structure 43 is indicated by 42. In a preferred form of embodiment, another air intake is located at the base or even along the walls of the rotary case or rotary mast. The device is equipped with bowls or fins which make it possible to orient the air along the motor mast. As the air is ejected around the hot gases, this makes it possible to cool them and to thus reduce the sound impact. The air oriented in this way between the reactor and the rotating mast can cool the gas around a temperature of approximately 300 to 400 degrees. This means that all of the spaces in which the gas is transported are less stressed by the heat of the gas.

Figure 5:
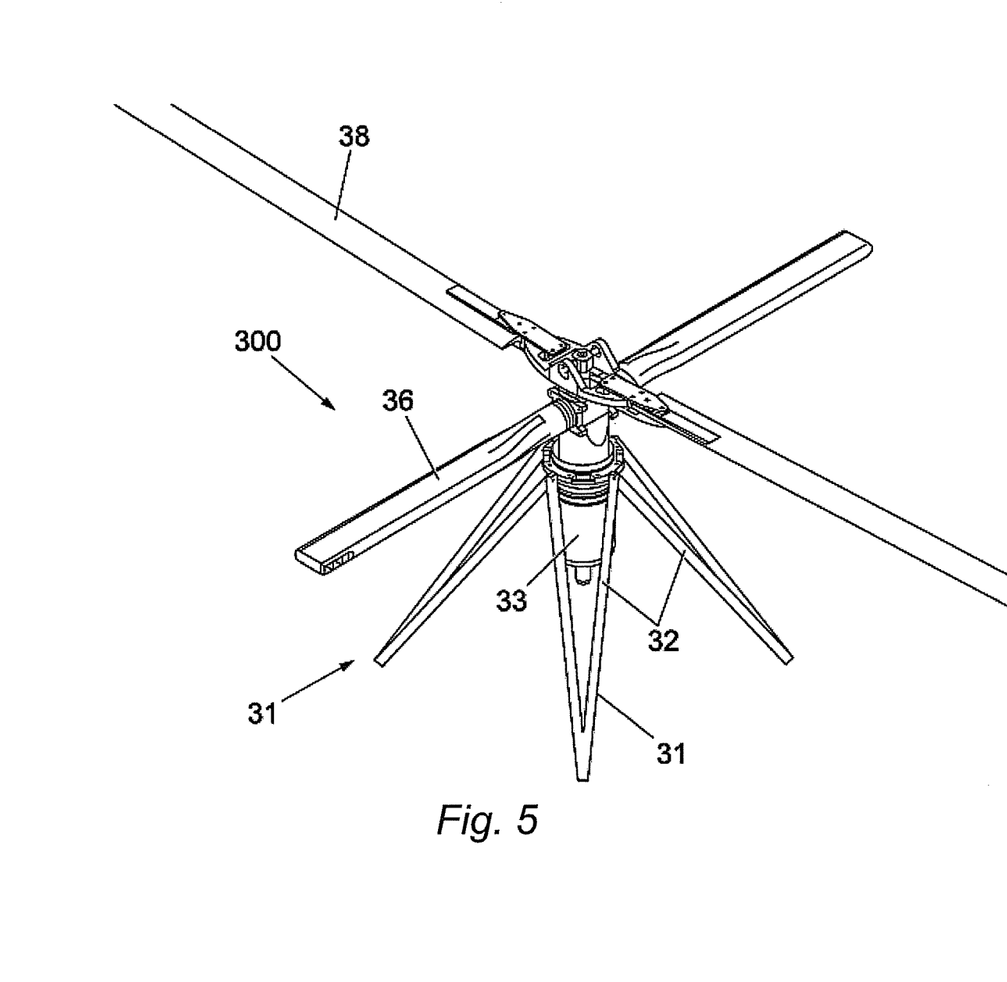
FIG. 5 shows a second form of embodiment of the aerial device according to the invention.

A second form of embodiment of an aerial model 300 is shown in FIG. 5. The aerial device 300 includes a structure 31 which makes it possible to fix the device 300 on a support such as a load. This structure 31 is equipped with fixing elements 32, such as for the first form of embodiment shown in FIG. 3.

The aerial module 300 includes a gas generator 33 realised such that the axes of the masts and the gas generator are merged. The aerial module 300 according to FIG. 5 include a first and a second blade 38. Furthermore the aerial device includes a first and a second motor arm 36.

Figure 6:
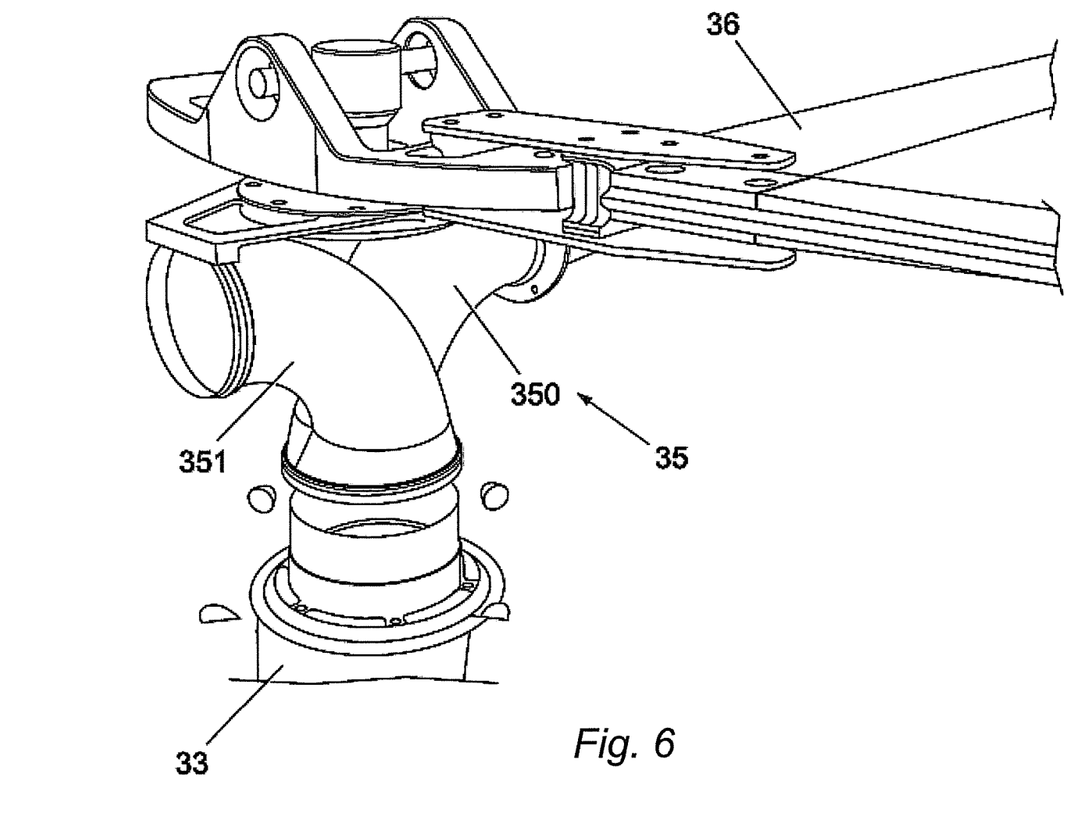
FIG. 6 shows the connection between the gas generator and the motor arm of the device according to FIG. 5.

The connection between the gas generator 33 and the motor arm 36 is shown in greater detail in FIG. 6. FIG. 6 shows a gas distribution arrangement 35 with a first element 350 and a second element 351 which each forms a connection between the gas generator 33 and a motor arm 36. For reasons of clarity, one single arm 36 has been shown in FIG. 6.

FIG. 6 shows that the construction of the device 300 provides a simple and robust connection that makes it possible to transfer the gases from the outlet of the gas generator 33 to the motor arm 36.

Figure 7:
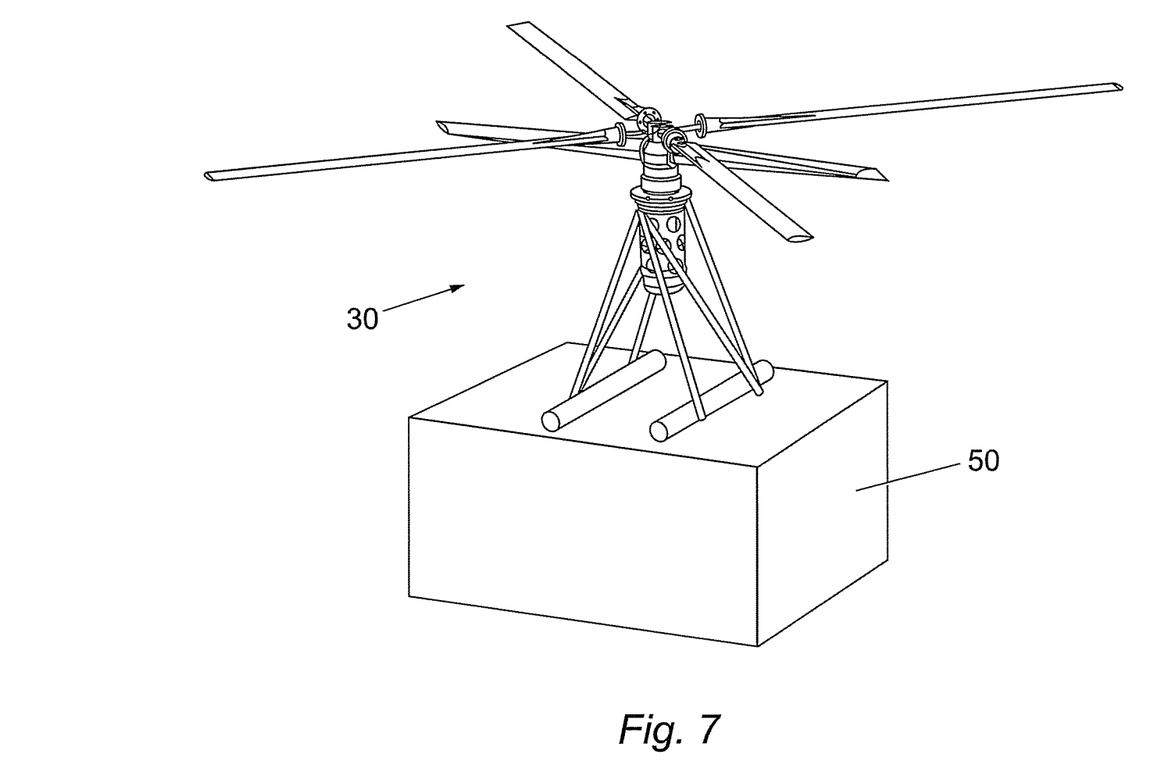
FIG. 7 shows the aerial device according to FIG. 3, fixed on a load.

In FIG. 7, the aerial device according to FIGS. 3 and 4 is shown fixed on a load 50. It should be understood that the aerial device 30, such as shown in FIGS. 7, 8, 9 and 10 could be replaced by the device 300 according to FIGS. 5 and 6. The assembly formed by the device 30 and the load 50 is capable of flying. The possibilities for fixing a load 50 on the device 30 are endless. The loads can be of any type, such as containers, land vehicles or maritime vehicles, etc. It is possible to move the loads 50 over distances of several kilometers, with substantial variations in altitude.

In theory, it is possible to mount a device 30 on a vehicle, such as shown in FIGS. 3 and 4. This last possibility of use is shown in FIG. 8.

Figure 8:
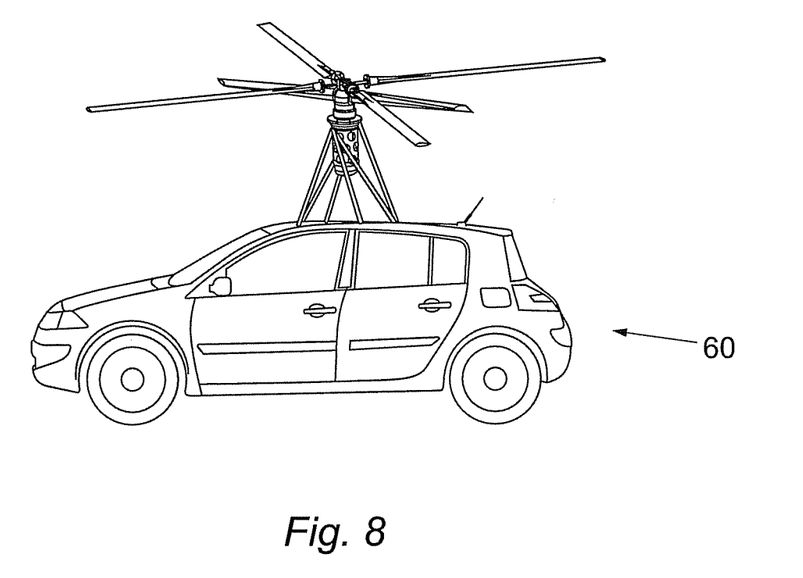
FIG. 8 shows the aerial device according to FIG. 3, fixed on an automobile.

FIG. 8 shows a car 60 equipped with a device 30 according to FIG. 3. The connections between the device 30 and the car 60 can be relatively simple and inexpensive.

Figure 9:
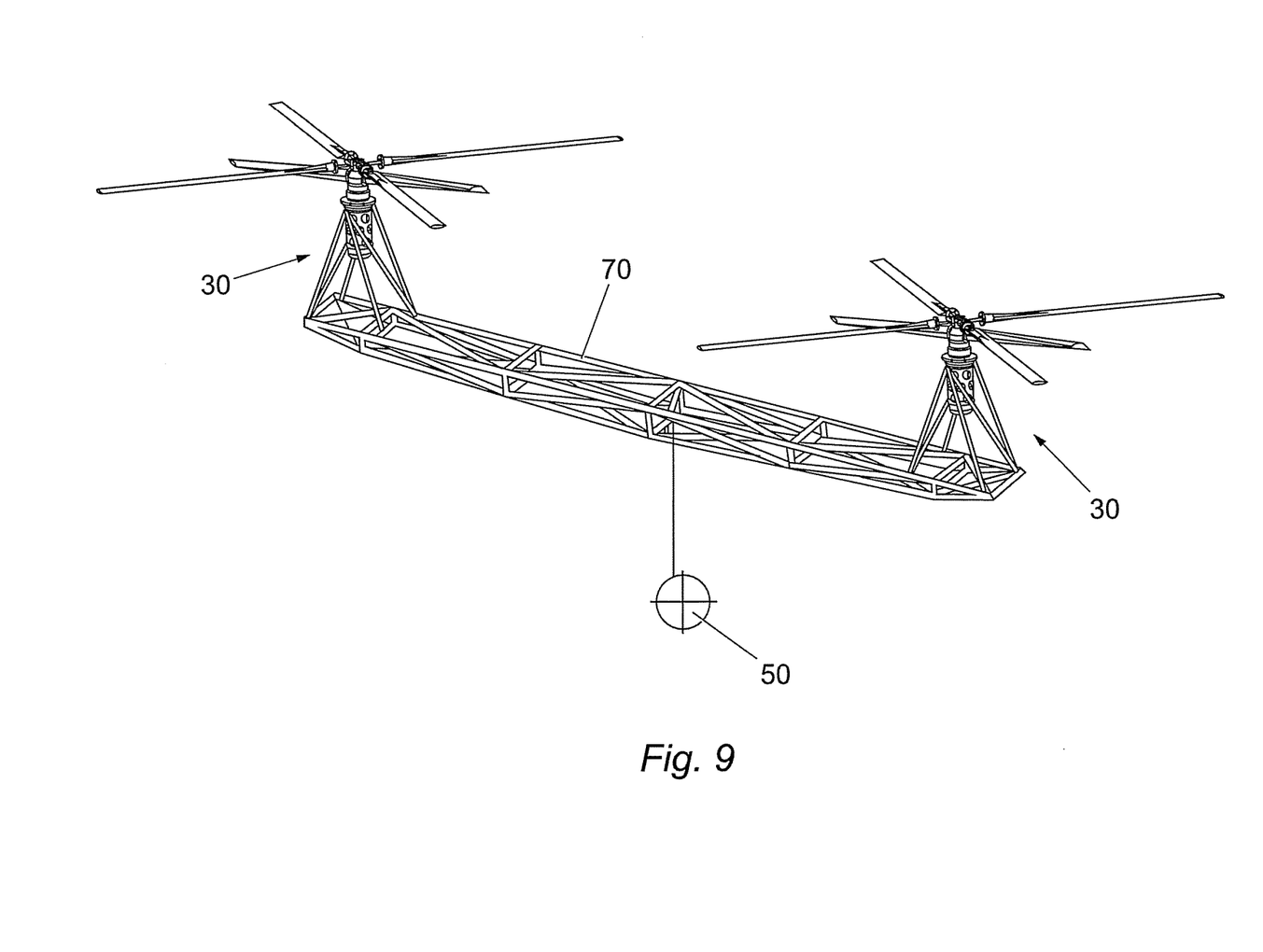
FIG. 9 shows a rigid structure equipped with several aerial devices according to the invention.

It should be understood that one of the great advantages of the device 30 according to the invention is its great degree of modularity. In FIG. 9, there is shown a rigid structure 70, coupled with a first and a second module 30 according to FIG. 3.

Figure 10:
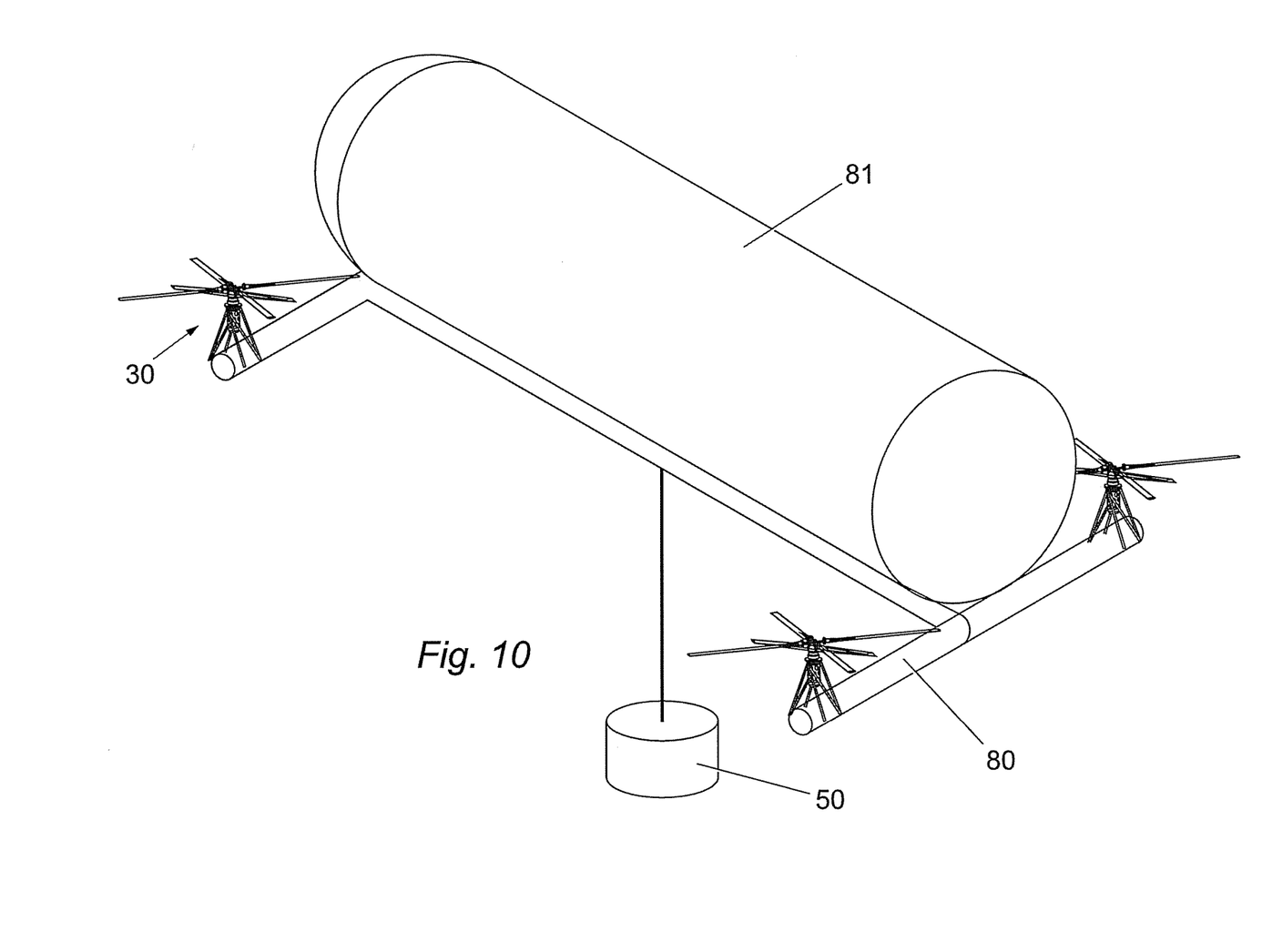
FIG. 10 shows an assembly of structures equipped with several aerial devices according to the invention, connected to a helium balloon.

The construction, shown in FIG. 9, presents the possibilities of using a rigid structure and several modules 30 in order to multiply to a greater extent the lifting force obtained by means of the assembly. Beneath such a structure 70, a load 50 can be lifted. Another possibility of using a rigid structure 70 and several aerial devices according to the invention is shown in FIG. 10. In FIG. 10, four aerial devices 30 according to the invention, which are installed on a structure 80, are shown. The structure according to FIG. 10 can be used for extreme loads 50. In order to cancel out the mass of the load 50, a helium balloon 81 is installed on structure 80. The fact that the helium balloon 80 is used means that the fuel consumption necessary to make the assembly fly can be reduced. Furthermore, the maximum weight which it is possible to raise is increased.

Figure 11:
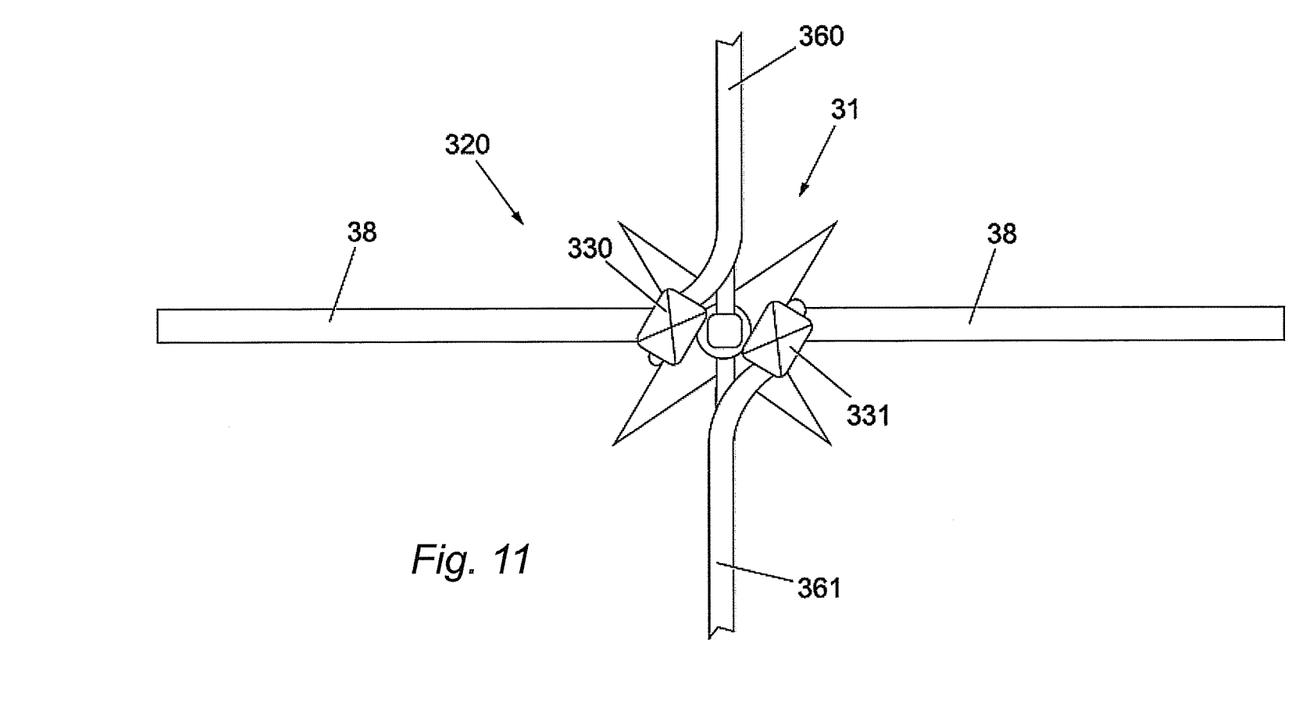
FIG. 11 shows a third form of embodiment of the aerial device according to the invention.

A third form of embodiment of the aerial device 320 according to the invention is shown in FIG. 11. According to FIG. 11, the aerial device 320 includes a structure 31 which makes it possible to fix the aerial device 320 on a support such as a load. The rotating part, which rotates by means of this structure 31, includes a first and a second blade 38. Furthermore, the rotating part includes a first and a second motor arm 360, 361.

According to FIG. 11 the motor arm 360 is connected to a first gas generator 330, the second motor arm 361 is connected to a second gas generator 331. The two gas generators 330 and 331 are integrated with the rotating part of the aerial device 320. This means that the gas part of the gas generators 330 and 331 can be directly connected to the inlet of the motor arm 360 and 361. The connections between the gas generator 33 and the motor arm 360 and the generator 331 and the motor arm 361 are therefore direct, simple and robust.

If the two gas generators 330 and 331 are integrated to the rotating part of the aerial device 320, the combustion tank for the gas generators can also be integrated to the rotating part of the aerial device 320. This means that the combustion tank rotates with the two gas generators and the motor arms to which said gas generators are connected.

Figure 12:
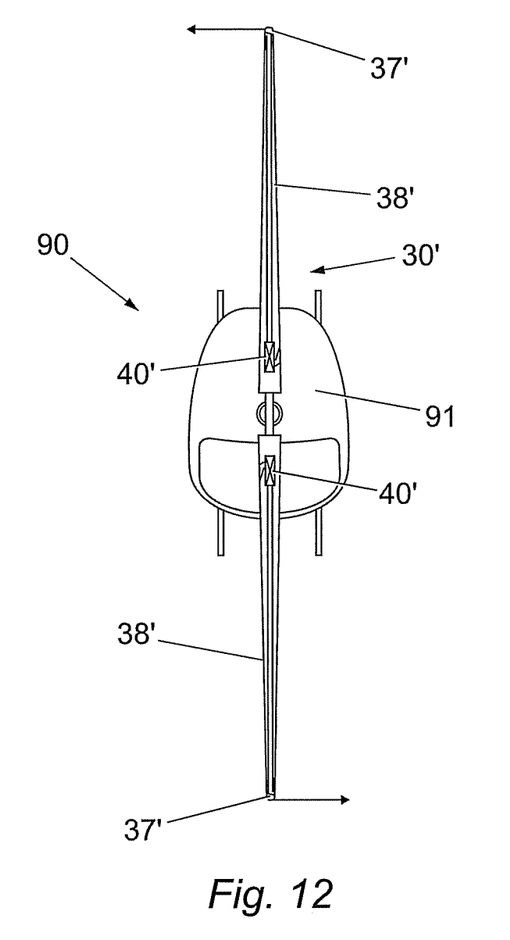
FIG. 12 shows a helicopter, equipped with an aerial device according to the invention, according to a second form of embodiment, and FIG. 13 schematically shows the grid of a terrain on which there is placed an aerial device according to the invention, which shall be able to be used in forest fire-fighting operations.

In a fourth form of embodiment of the aerial device according to the invention, the gas generators are positioned directly at the interior or are integral with the blades. Such a device, which is used to realise a helicopter, is shown in FIG. 12. The helicopter 90 includes a crew compartment 91 equipped with the aerial device 30' according to the invention. The device 30' includes a first and a second blade 38'. Inside the blades 38, there is found a gas generator 40'. The blades 38' are equipped with orifices 37' at their ends.

In the construction shown in FIG. 12, the gas generators 40' are an integral part of the blades 38'. This means that these rotate, with the blades, around a rotation axis. An air current is created with the aid of the blades 38'. Using this construction, the aerial device 30' according to the invention does not need complex connections to drive the gas produced by the gas generators 40' towards their respective destinations 37'.

In FIG. 12, there is shown a helicopter 80 comprising two blades 38'. The system according to FIG. 12 is modular: this means that if a more significant ascending force is necessary, the quantity of blades 38' can be increased. The system can be provided with four to six blades.

The devices 30 and 30' according to the invention, in combination with a load, can be used for several purposes. One of these consists in using this device without the need for personnel. This means that the devices 30 and 30' according to the invention can be driven using a remote control. Alternatively, the devices 30 and 30' according to the invention can be connected to a managing system in order to be pre-programmed and to carry out missions autonomously. In this case, the situation which makes necessary the intervention of the devices 30 and 30' is identified with the aid of sensors. The sensors send signals to the management system which automatically takes control of the devices in order to ensure the necessary intervention of the devices 30 and 30'.

Figure 13:
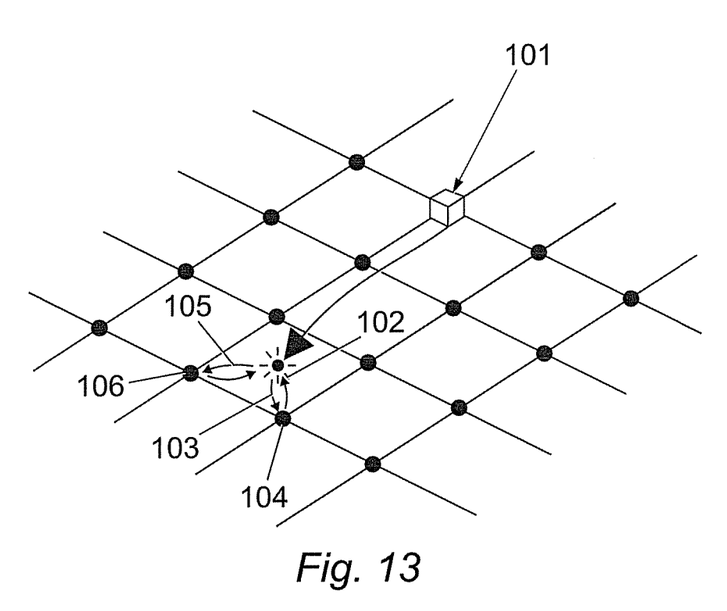

One of the different uses of the devices 30 and 30' is shown in FIG. 13. A part of a terrain comprising a landing base 101 is schematically represented in FIG. 10. In this base, the devices 30 and 30' according to the invention are prepared and ready to be used.

If a fire alarm is raised near this base, the devices 30 and 30' according to the invention shall be navigated with the aid of a remote control or automatically, to the location of the fire 102. The devices 30 and 30' according to the invention shall be, for example, equipped with a first quantity of water which makes it possible to attack the start of the fire. The remote control of the devices 30 and 30' according to the invention can eventually be regulated in "automatic mode" without any other human intervention. This means that it is possible to intervene very rapidly, from the first alarm, since the helicopter is immediately operational. After the first water bombing, the devices 30 and 30' according to the invention can be navigated towards a depot, which is present near the base, follow the path 103, arrive at a new water supply facility 104 and refill with water for renewed water bombing.

If the water supply facility 104 is no longer stocked with water, the devices 30 and 30' according to the invention can then follow the path 105 in order to arrive at a new water supply point 106 and thus to continue their mission.

The devices 30 and 30' according to the invention can accomplish all of these rotations by means of remote-controlled or automated guiding and, for example, can be immediately operational in the first thirty minutes following the start of a fire. After this time has elapsed, the Canadairs and the firemen can take over It is important to note that the use of the devices 30 and 30' according to the invention according to FIG. 13 to fight a fire only represents one of the different possibilities for using this device.

What is claimed is:

1. An aerial device, comprising a structure and a rotating element equipped with at least one blade, suitable for effecting a rotation relative to the structure around a rotation axis, wherein the device is equipped with propulsion means to cause the rotating element to rotate relative to the structure and wherein these propulsion means include a gas generator fixed in the structure such that the gas generator does not rotate with respect to the structure and at least two pipes for guiding a gas produced by the generator towards at least two orifices at a distance from this rotation axis in order to cause rotating elements to rotate by means of the gas ejected through the orifices, characterised in that the device is equipped with at least first and second motor arms, each of which extends in a direction that is essentially perpendicular to the rotation axis and wherein one of the pipes is positioned in each of the motor arms in order to guide the gas towards the orifice in each of the motor arms, wherein the device further comprises a gas distribution arrangement that forms a connection between the gas generator and each of the motor arms, the gas distribution arrangement being configured to pass the gas produced by the generator towards the motor arms, the gas distribution arrangement and the motor arms being part of the rotating element and configured for rotating around the rotation axis relative to the structure and the gas generator in order to eject the gas from the generator directly into the motor arms, wherein the gas distribution arrangement comprises first and second opposite facing elbows that rotate with respect to the gas generator, the first and second elbows being first and second separate pipes, each having a substantially cylindrical cross section, wherein the first and second pipes are offset from each other in a direction perpendicular to the rotation axis and wherein the first and second pipes form an offset Y where the first pipe forms a first branch of the offset Y and the second pipe forms a second branch of the offset Y that is not co-planar with the first branch, the first pipe including a single bend between an outlet of the gas generator and an inlet of the first motor arm, the second pipe including a single bend between the outlet of the gas generator and an inlet of the second motor arm, wherein the first pipe forms a first path for the gas that is separate from a second path for the gas formed by the second pipe over substantially an entire volume between the outlet of the gas generator and the inlets of the motor arms, the first and second paths being respectively and separately enclosed by the first and second pipes, wherein the outlet of the gas generator is connected directly to an inlet of the gas distribution arrangement.

2. The aerial device according to claim 1, wherein the gas generator is positioned in the device with its central axis concentric to the rotation axis of the rotating element.

3. The aerial device according to claim 1, wherein the motor arms are profiled in order to contribute to the lift generated by the rotating element.

4. The aerial device according to claim 1, wherein the structure is suitable for fixing the aerial device on a load.

5. The aerial device according to claim 1, wherein the device is equipped with a remote control to remotely control the lift generated by the rotating element.

6. A heavier-than-air aircraft equipped with an aerial device according to claim 1.

* * * * *